(12) United States Patent
Ofray

(10) Patent No.: US 8,610,301 B2
(45) Date of Patent: Dec. 17, 2013

(54) JET STREAMER TURBINE FOR GENERATING POWER

(76) Inventor: Alvin Ofray, Greensboro, NC (US)

(*) Notice: Subject to any disclaimer, the term of this patent is extended or adjusted under 35 U.S.C. 154(b) by 107 days.

(21) Appl. No.: 13/351,161

(22) Filed: Jan. 16, 2012

(65) Prior Publication Data

US 2012/0187697 A1  Jul. 26, 2012

Related U.S. Application Data

(60) Provisional application No. 61/461,661, filed on Jan. 21, 2011.

(51) Int. Cl.
*F01D 15/10* (2006.01)

(52) U.S. Cl.
USPC ............................................. 290/52; 415/108

(58) Field of Classification Search
USPC .............. 290/52; 415/220, 4.3, 4.5, 101, 108, 415/201, 203, 214.1, 215.1
See application file for complete search history.

(56) References Cited

U.S. PATENT DOCUMENTS

| 4,424,452 A | * | 1/1984 | Francis | 290/55 |
| 5,030,877 A | * | 7/1991 | Denk | 290/52 |
| 5,553,454 A | * | 9/1996 | Mortner | 60/409 |
| 7,214,029 B2 | * | 5/2007 | Richter | 415/4.5 |
| 8,277,175 B2 | * | 10/2012 | Garrison et al. | 415/126 |

* cited by examiner

*Primary Examiner* — Vanessa Girardi
(74) *Attorney, Agent, or Firm* — Sinorica, LLC

(57) ABSTRACT

A jet streamer turbine comprises a top housing, a center housing, a bottom housing, a plurality of vacuum fan housing, a nose propeller housing and an exit air housing. The plurality of vacuum fan housing comprise a first vacuum fan housing and a second vacuum fan housing. The top housing and the bottom housing is connected to the center housing from top and bottom respectively. The first vacuum fan housing and the second fan vacuum fan housing are positioned behind the top housing. The exit air housing is positioned behind the first vacuum fan housing and the second fan vacuum fan housing. A plurality of backward extenders is connected to the exit air housing. The nose propeller housing is connected to the front side of the top housing with a plurality of forward inward extenders.

16 Claims, 14 Drawing Sheets

JET STREAMER TURBINE FOR GENERATING POWER

The current application claims a priority to the U.S. Provisional Patent application Ser. No. 61/461,661 filed on Jan. 21, 2011.

FIELD OF THE INVENTION

The present invention relates generally to renewable energy system using a combination of solar energy and the wind energy to powers stationary devices in a fixed object or in a moving object with a minimum amount of environmental pollution.

BACKGROUND OF THE INVENTION

Fossil fuel is one of the main energy sources for many applications during the past hundred years of the modern world. The supply of the fossil fuel is being depleted at a fast pace due to the development of the technology and extensive use. Environmental pollution caused by the fossil fuel also increased because of the excessive use by the modern world. Solar energy and wind energy, which are considered as renewable energy sources, have minimum amount of pollution towards the environment. The use of these renewable energy sources have been increasing rapidly in the recent history. Solar energy is captured from the use of solar panels and the wind energy is captured from the use of wind turbines. Most of these applications have limitations. Because of their limitations, these applications are hardly used by the automotive industry. Most vehicles are completely powered by gasoline or diesel. With the increasing number of automobiles in the transportation system, the use of gasoline also increases. When passengers of these vehicles turn on the heating or cooling system in a vehicle, they need to keep the vehicle engine running to provide the power supply for the heating or cooling system, even if the car is not moving at the time, which means, for this purpose the passengers has to spend fuel, and meanwhile, pollute the air. If there is an apparatus that can be implemented into the vehicle in order to reduce the amount of gasoline being used, it will be a great addition to the vehicle industry and to the consumers, as well. So, it is the objective of the present invention to overcome the above mentioned drawbacks. The present invention uses the jet streamer turbine to generate electricity power that can be stored in an associated battery, which will further provide power supply for various on vehicle appliances or even for driving the vehicle. The present invention can be used in a vehicle to power some of the appliances in the vehicle whether the vehicle is moving or stationary. The invention is not limited to the vehicle industry and it can also be used in the housing industry with the same great results.

DETAIL DESCRIPTIONS OF THE INVENTION

Figure 1:
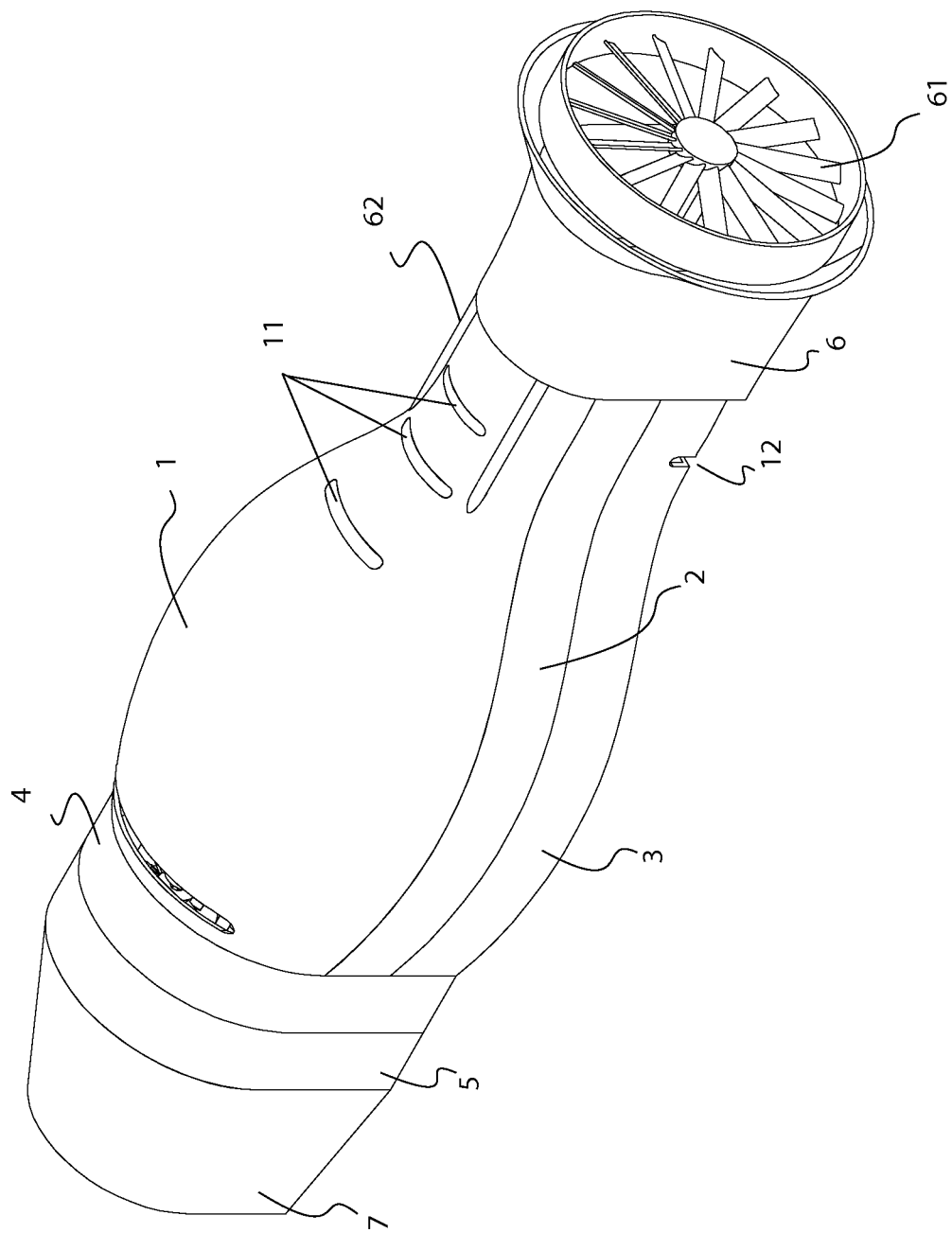
FIG. 1 is a perspective view of the present invention.
Figure 2:
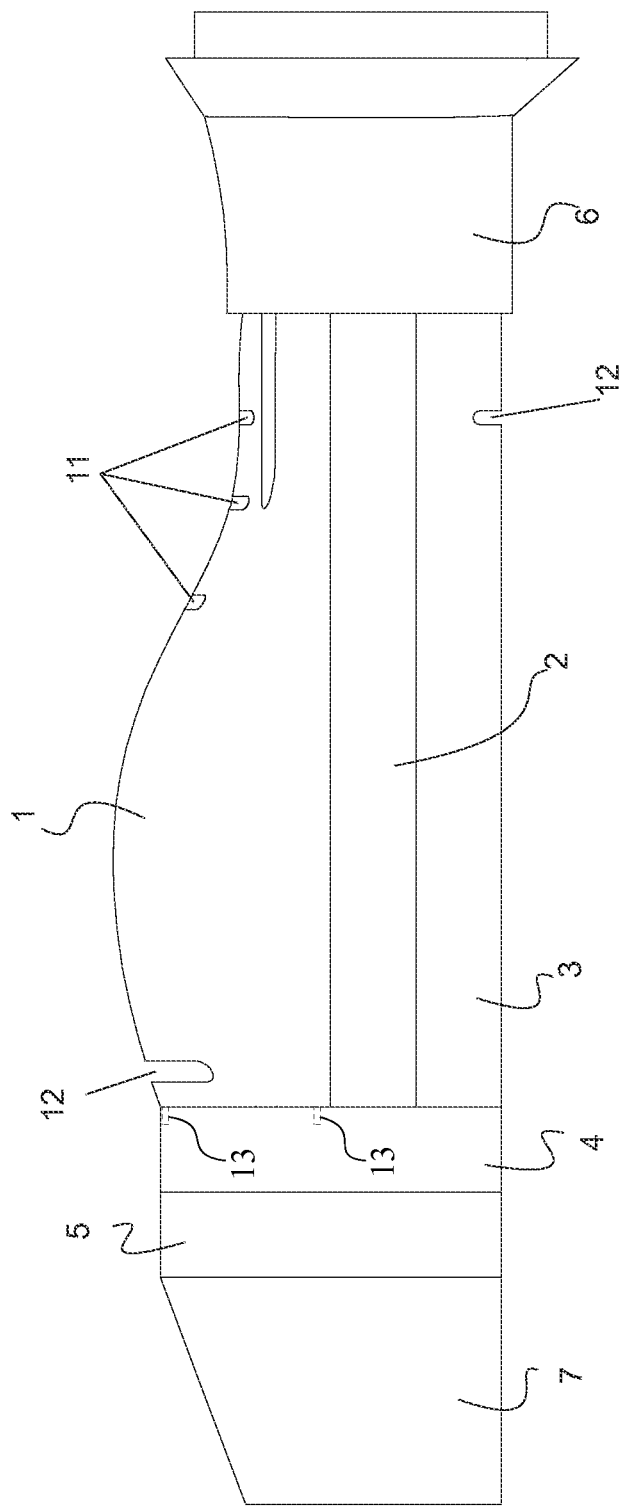
FIG. 2 is a side view of the present invention.
Figure 3:
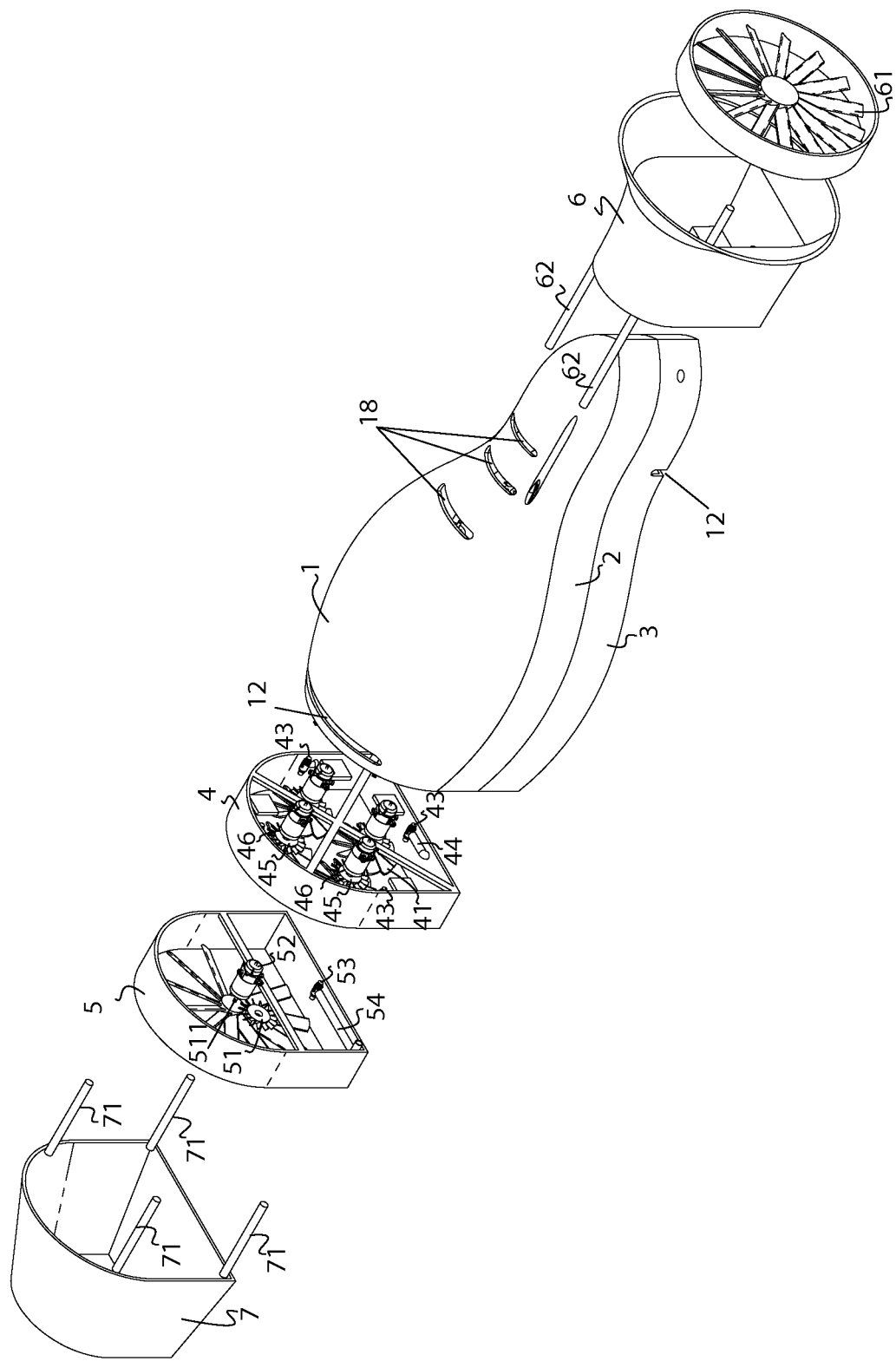
FIG. 3 is an exploded view of the present invention.
Figure 4:
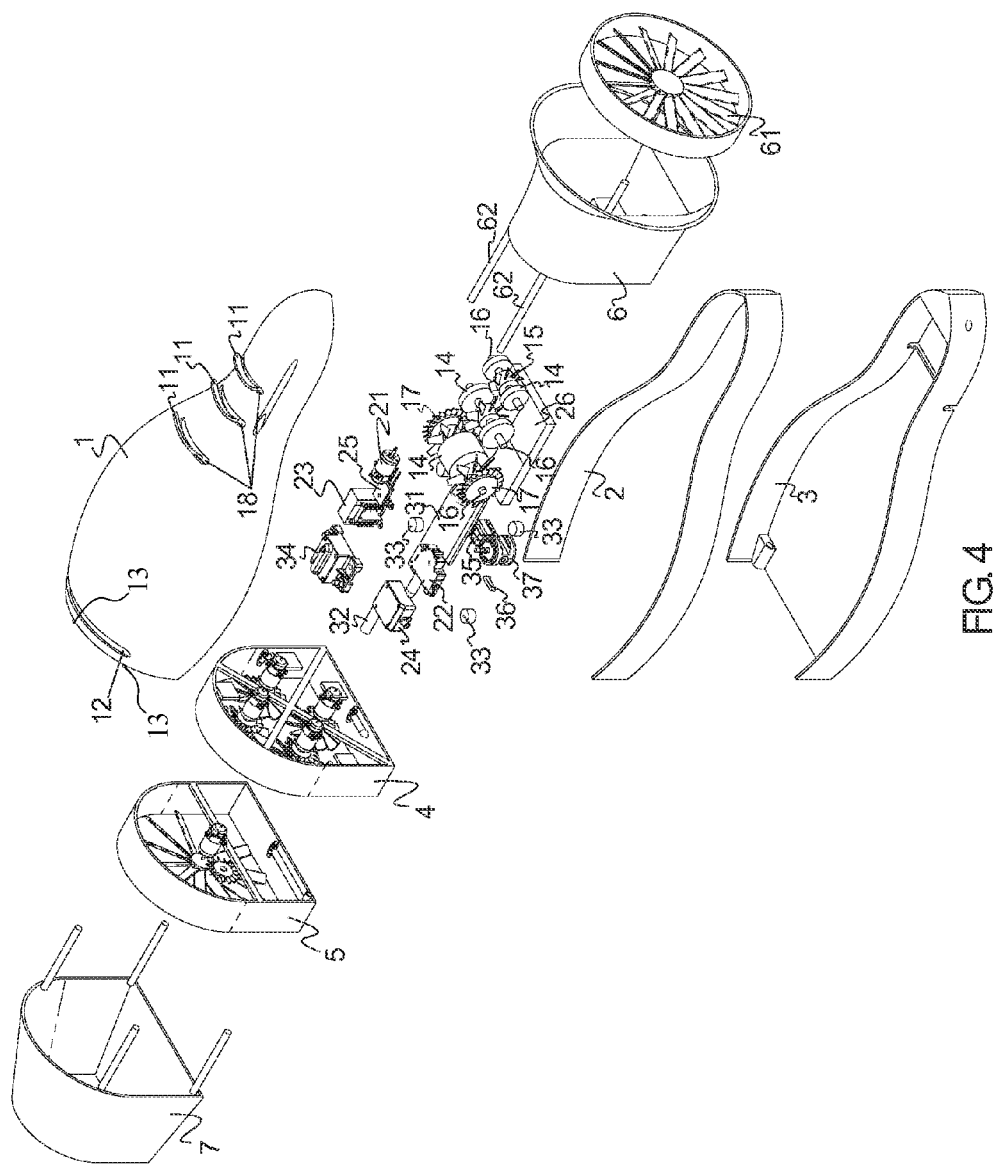
FIG. 4 is an exploded of the present invention with the exploded view of the inside components in the top housing, center housing, and the bottom housing.
Figure 5:
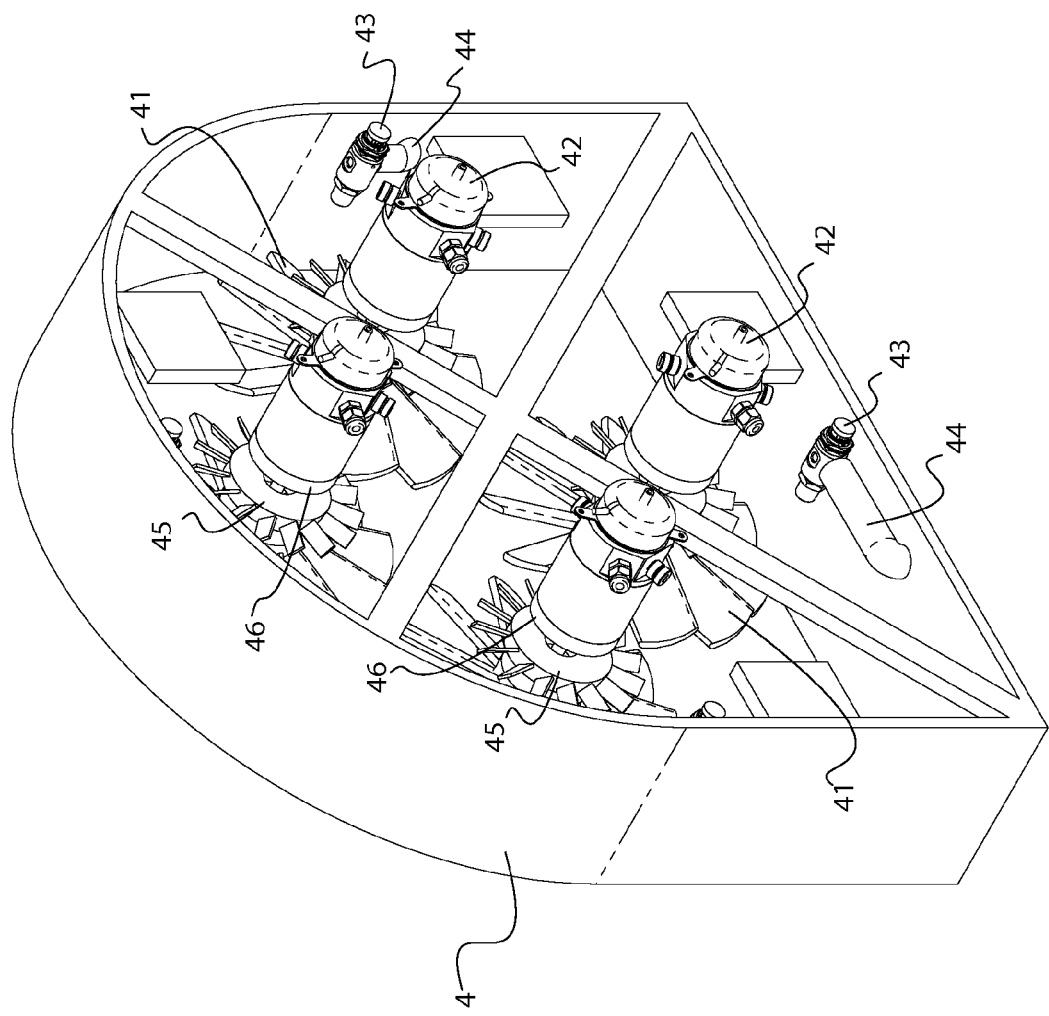
FIG. 5 is a perspective view of the first vacuum fan housing.
Figure 6:
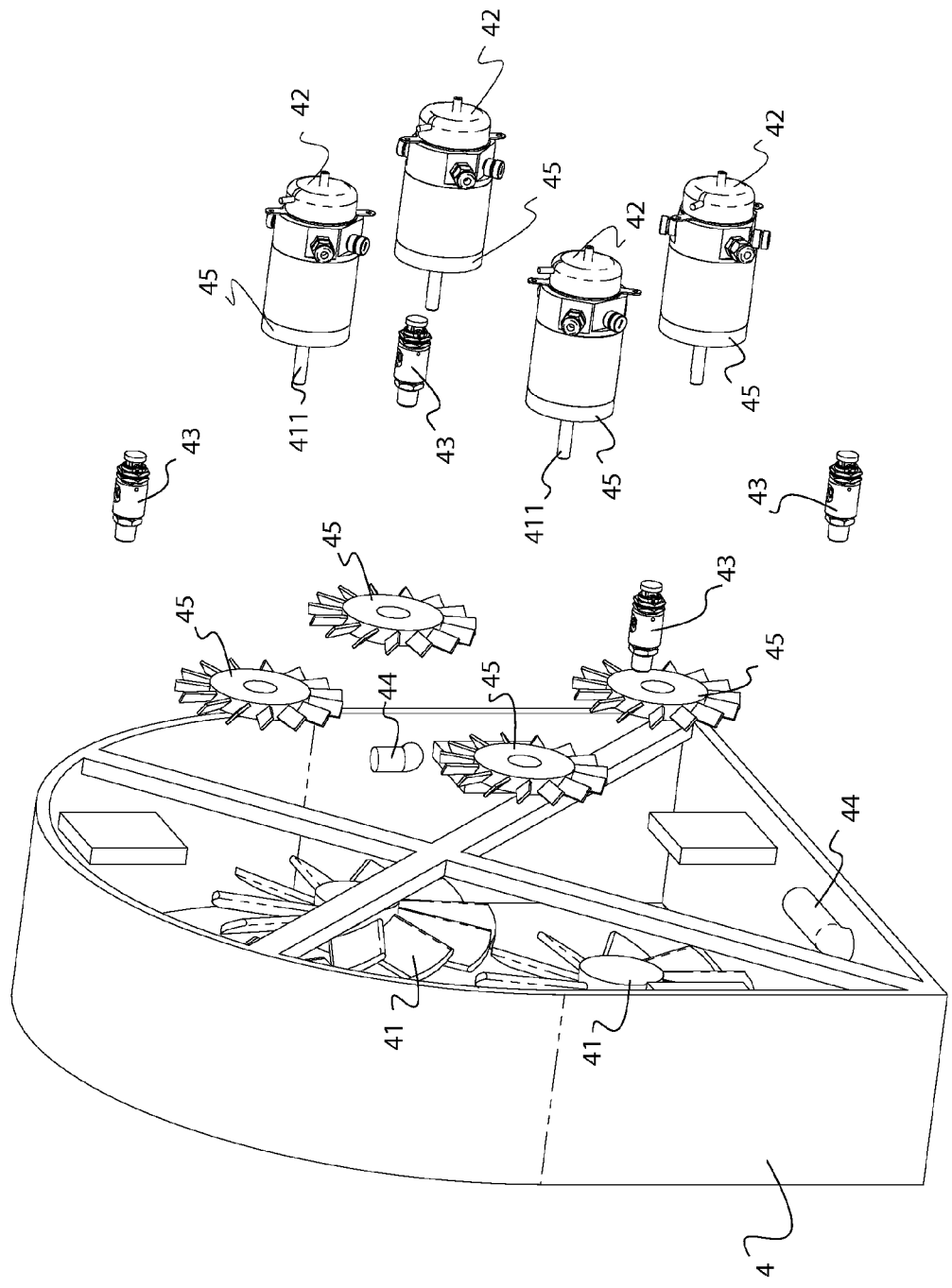
FIG. 6 is an exploded view of the first vacuum fan housing.
Figure 7:
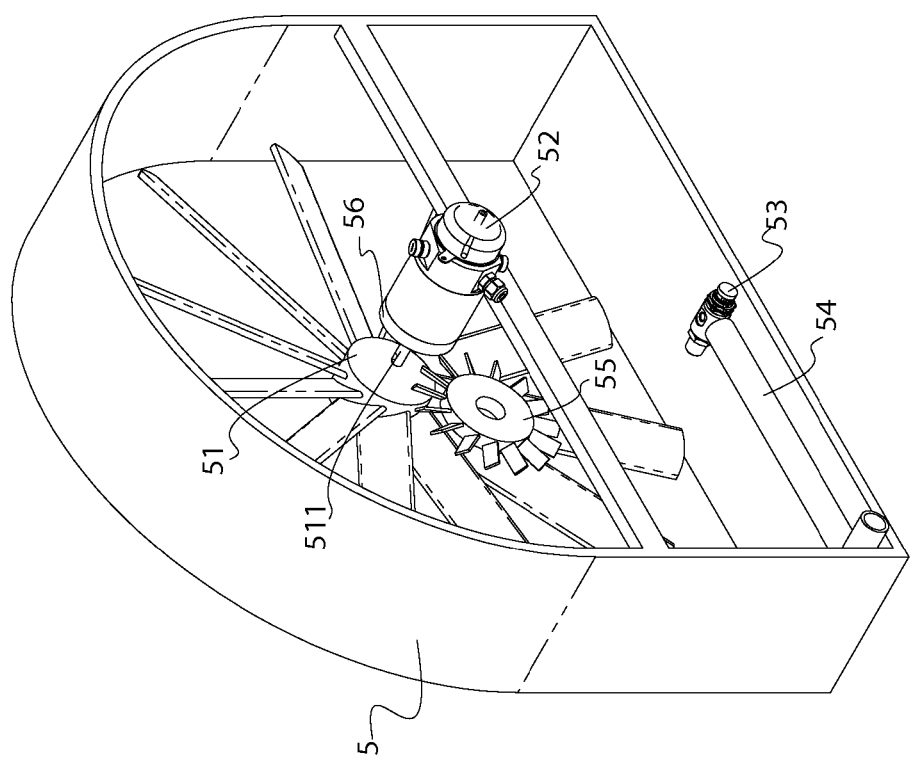
FIG. 7 is a perspective view of the second vacuum fan housing.
Figure 8:
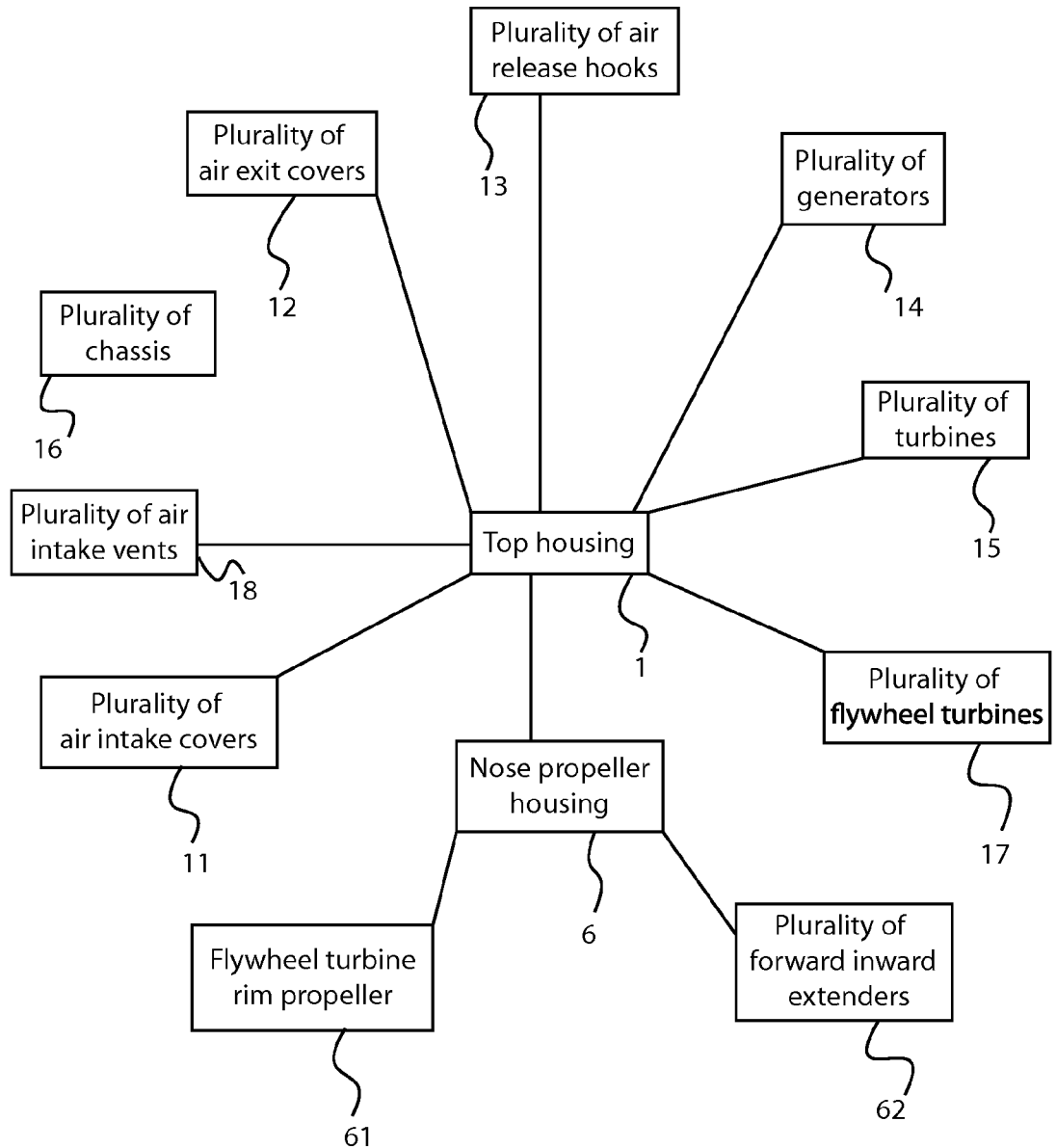
FIG. 8 is view of the system for the top housing.
Figure 9:
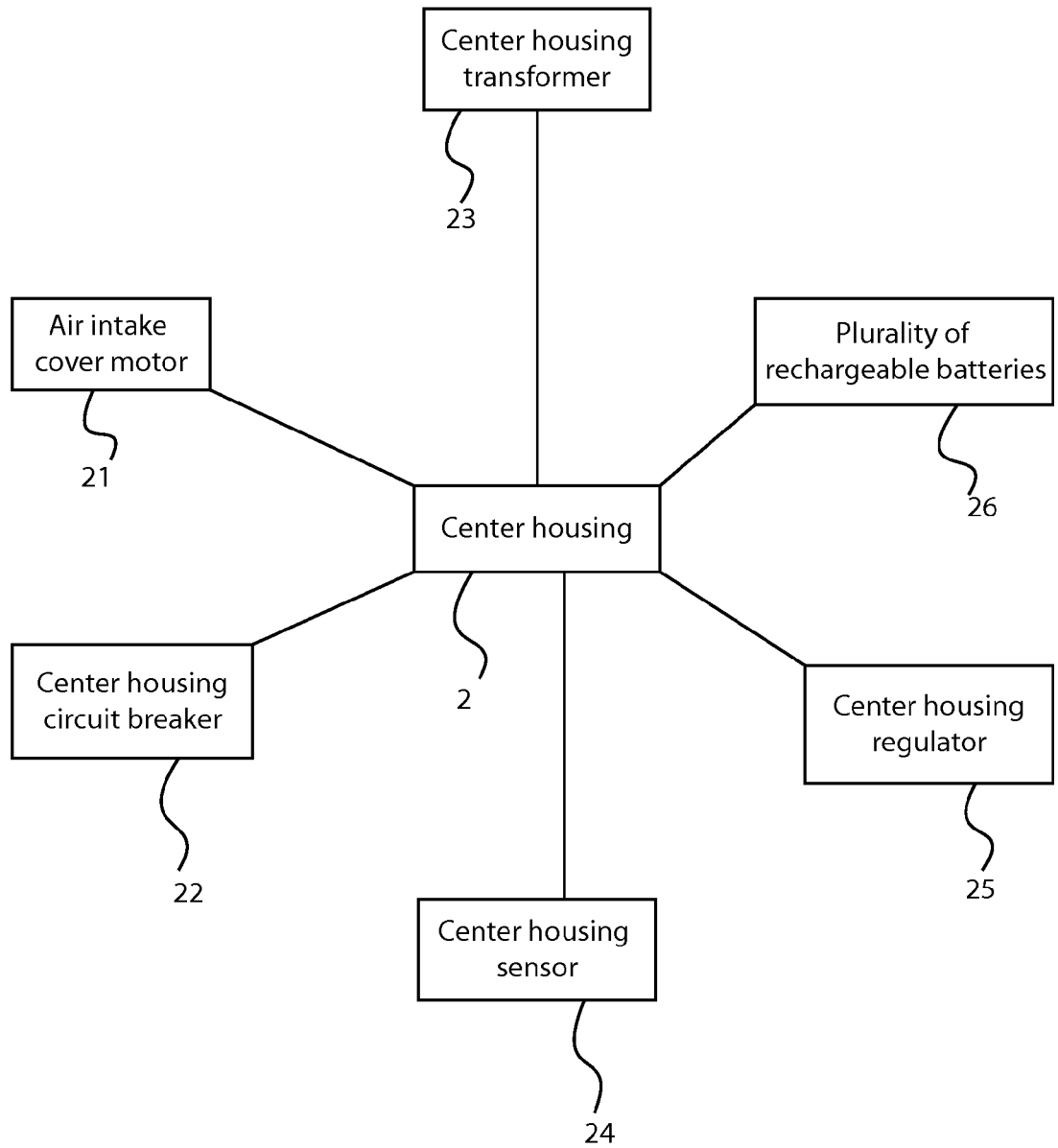
FIG. 9 is view of the system for the center housing.
Figure 10:
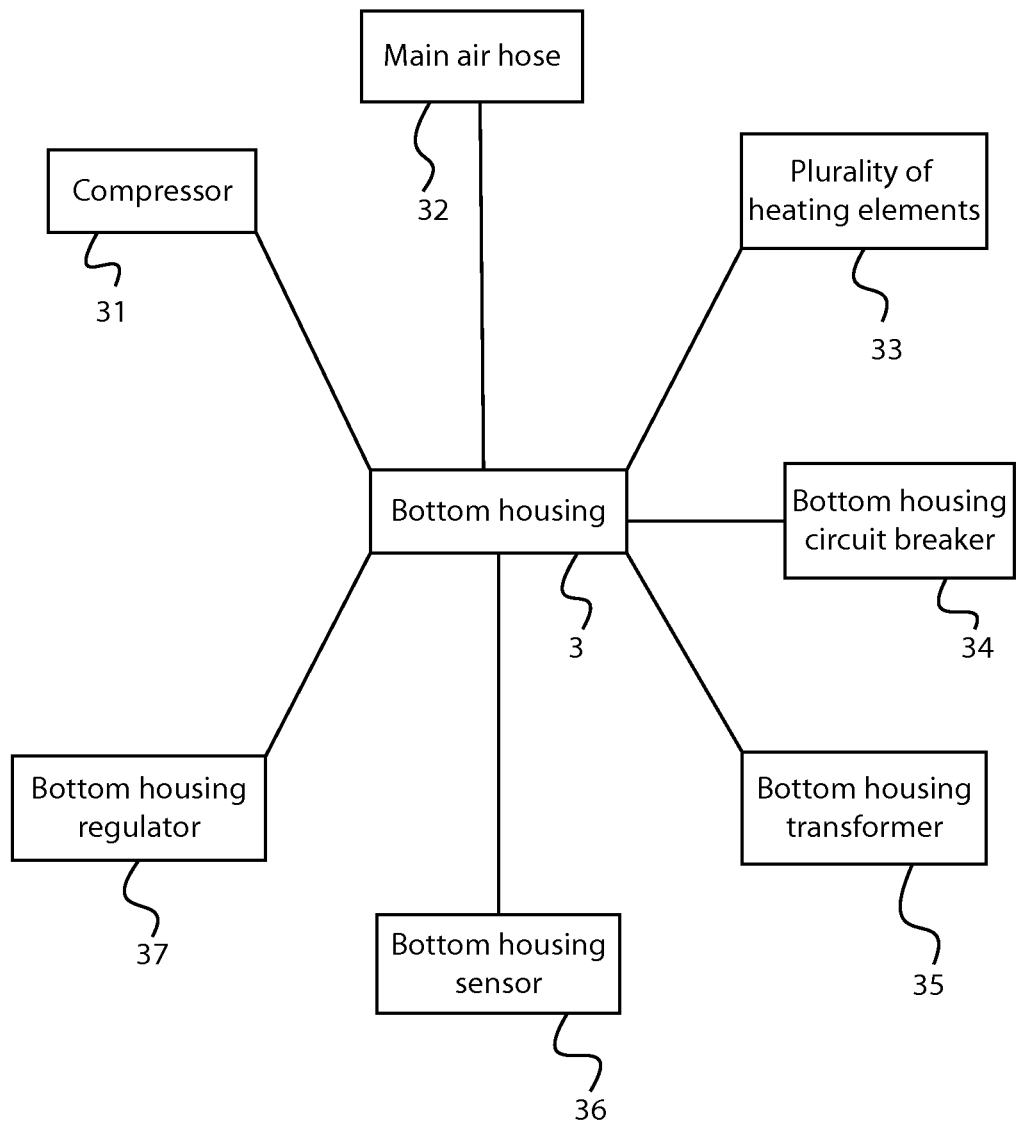
FIG. 10 is view of the system for the bottom housing.
Figure 11:
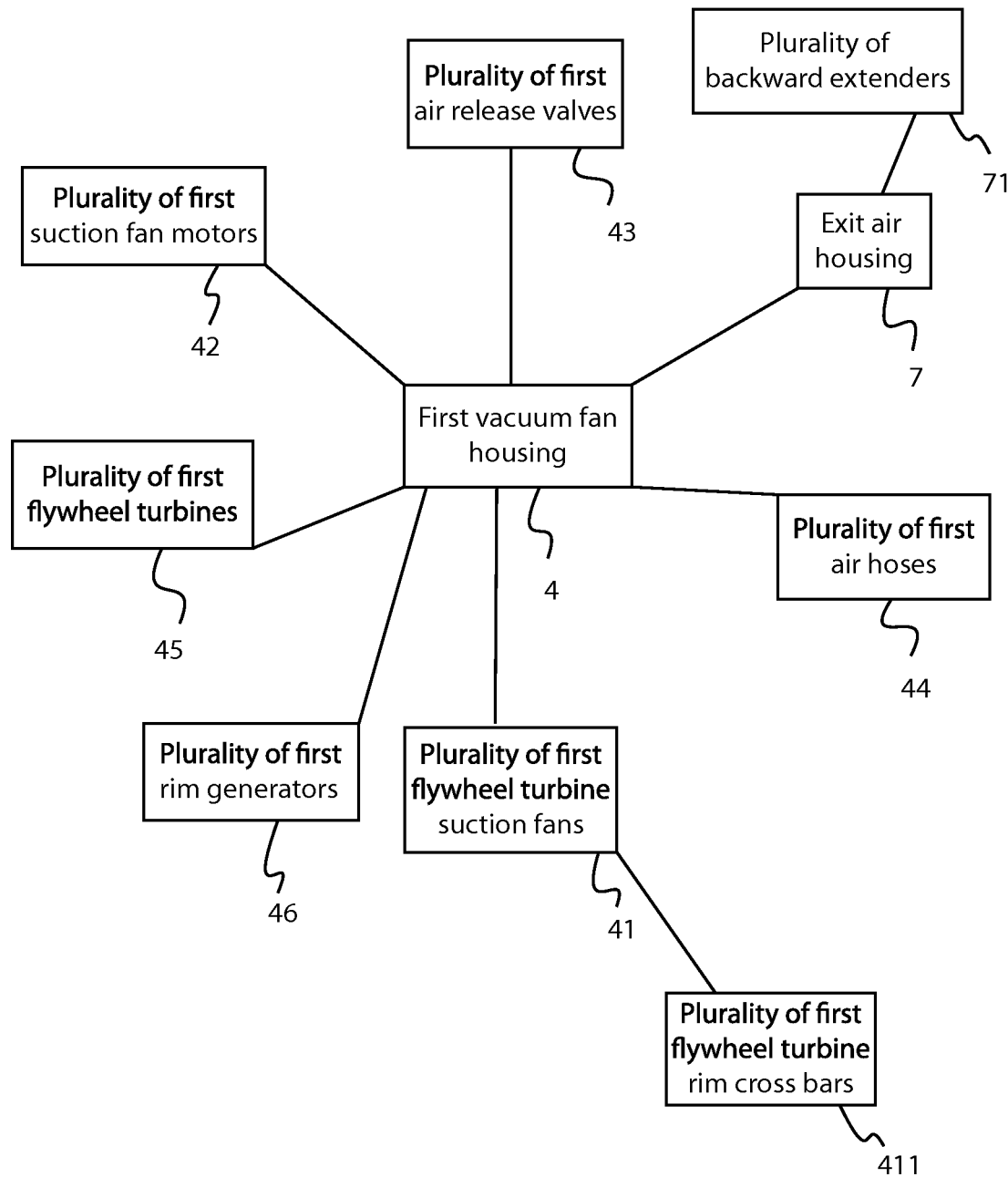
FIG. 11 is view of the system for the first vacuum fan housing.
Figure 12:
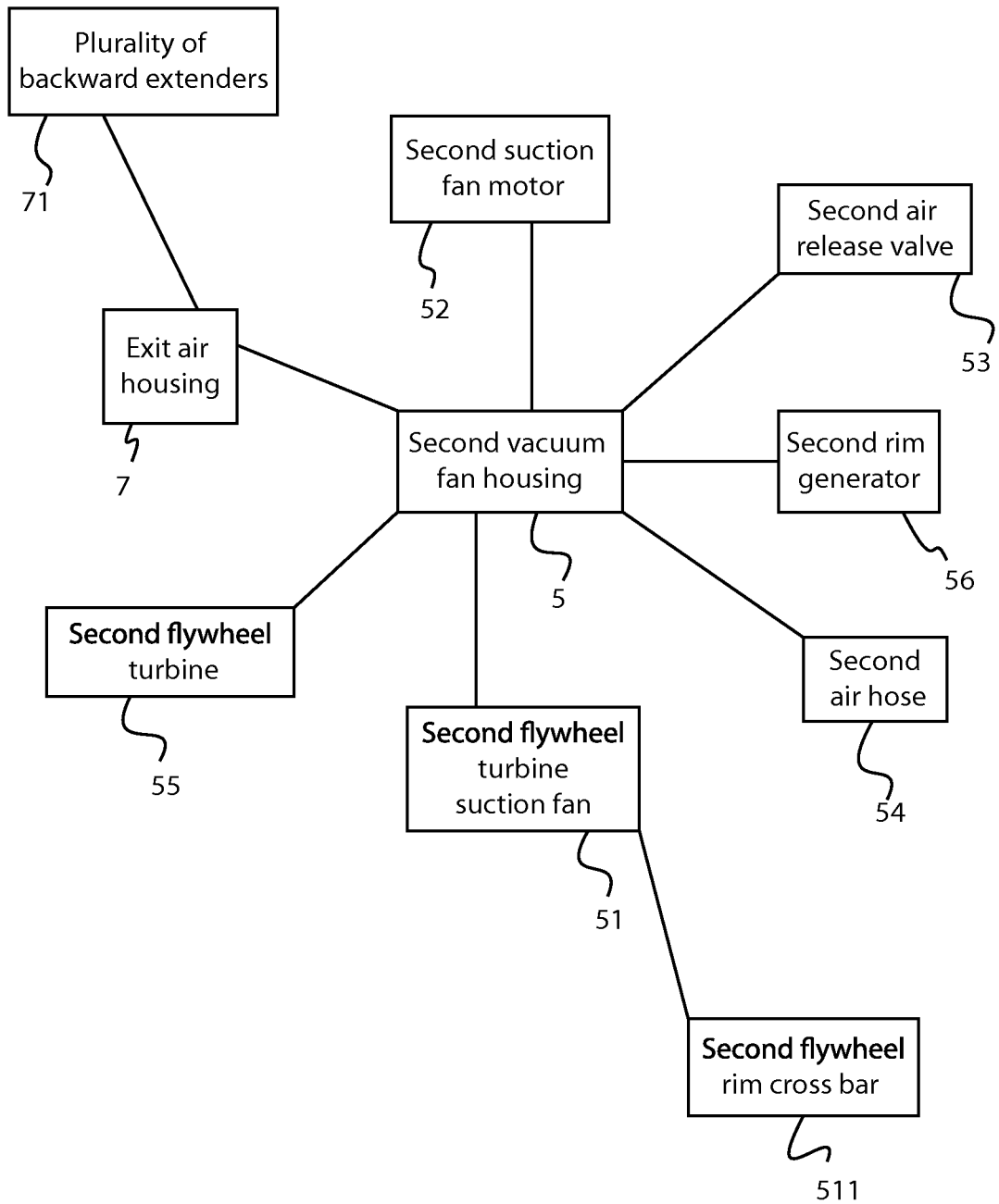
FIG. 12 is view of the system for the second vacuum fan housing.
Figure 13:
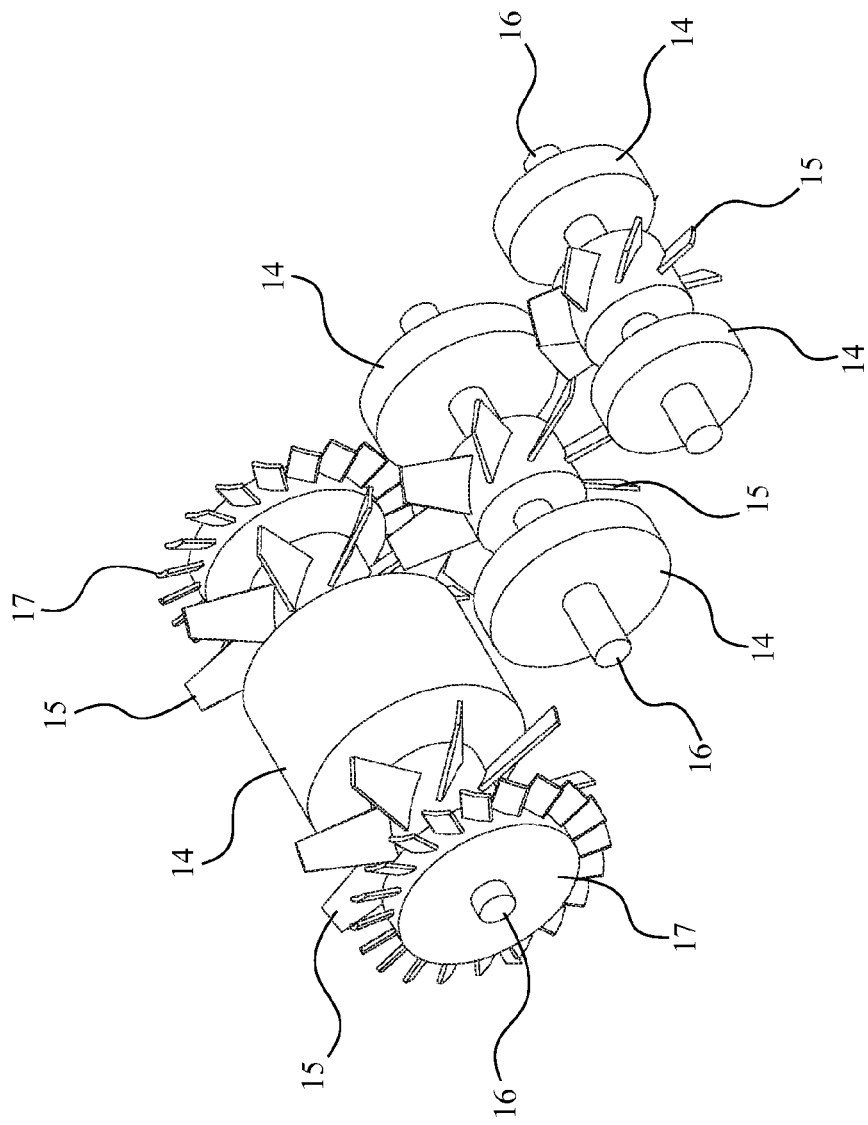
FIG. 13 is a detail view a plurality of generators, a plurality of turbines, a plurality of flywheel turbines, and a plurality of chassis of the of the present invention.
Figure 14:
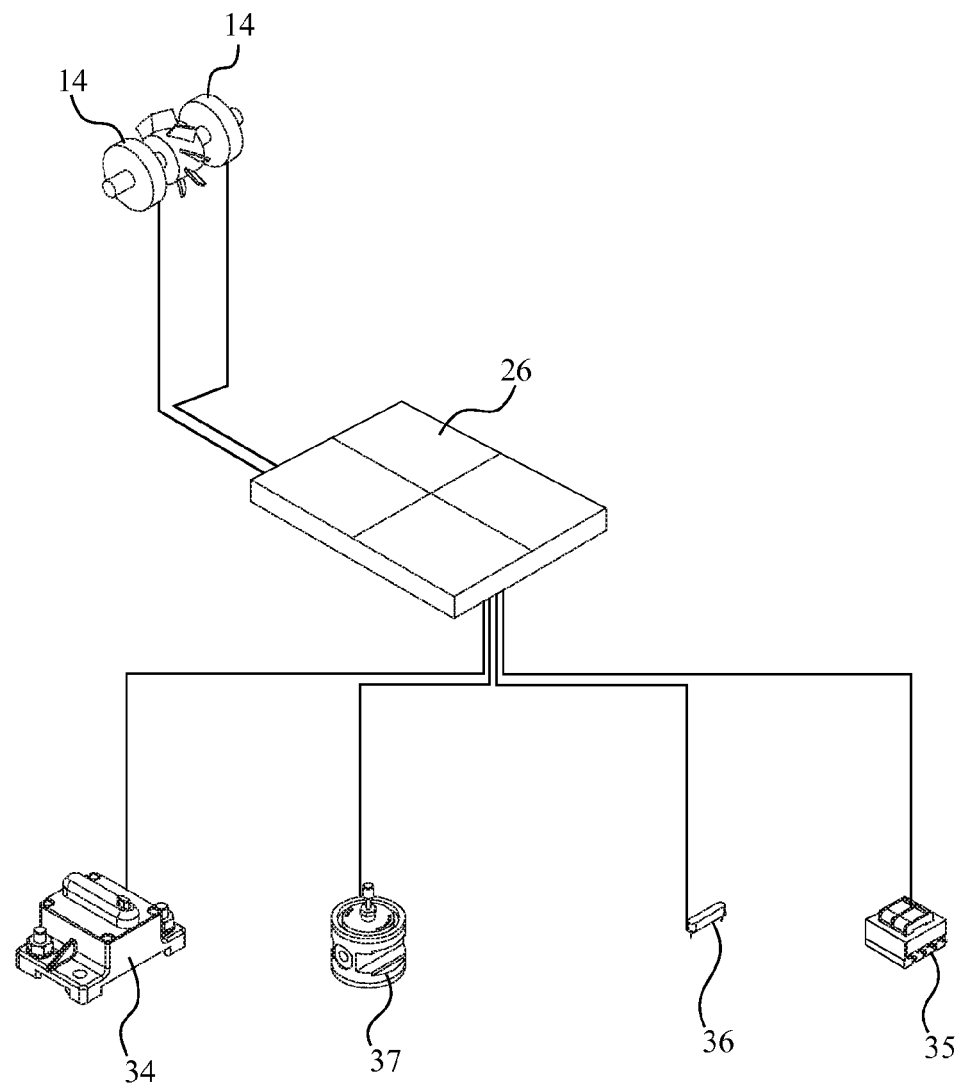
FIG. 14 is an electrical connection view of the plurality of generators, a plurality of rechargeable batteries, a bottom housing circuit breaker, a bottom housing transformer, a bottom housing sensor, and a bottom housing regulator.

All illustrations of the drawings are for the purpose of describing selected versions of the present invention and are not intended to limit the scope of the present invention.

The jet streamer turbine is a self contained electric power source which operates with natural air. The electric power will be produced no matter the unit is in motion or in stationary position. The jet streamer turbine is a transformable unit that can be motorized by heat flow, and impulsed by compressor. With the rechargeable battery, it is a rechargeable powered, or hybrid powered—electro turbine—. The jet streamer turbine comprises a top housing 1, a center housing 2, a bottom housing 3, a pair of vacuum fan housings, an exit air housing 7, and a nose propeller housing 6.

The top housing 1 comprises a plurality of air intake vents 18, a plurality of air intake covers 11, a plurality of air exit vents 12, a plurality of air release hooks 13, a plurality of generators 14, a plurality of turbines 15, a plurality of chassis 16, and a plurality of flywheel turbines 17. The plurality of air intake vents 18 is positioned toward the front surface of the top housing 1. The plurality of air intake covers 11 is connected to the outside surface of the top housing 1. Since the plurality of air intake covers 11 is positioned outside the top housing 1, the plurality of air intake covers 11 will lay flat against the top housing 1 and will prevent the entrance of water or any other unwanted substance into the top housing 1. The plurality of air intake covers 11 is motorized and will control the amount of air enter the top housing 1. From the opening and closing of the plurality of air intake covers 11, the amount of air needed for the operation of the jet streamer turbine will be controlled. The plurality of air exit vents 12 is designed into the top housing 1 so the excess air can leave the system creating an equilibrium system inside the top housing 1. The plurality of air release hooks 13 is positioned in the back side of the top housing 1. The plurality of air release hooks 13 is also released excess air out from the top housing 1. The top housing 1 and the plurality of air intake covers 11 will be made out of light weighted materials that are capable of withstand a great wind pressure. These materials can be high strength plastic, metal or combination of both. The plurality of generators 14, the plurality of turbines 15, and the plurality of flywheel turbines 17 are connected to together by the plurality of chassis 16. The plurality of chassis 16 is connected with the plurality of generators 14 and the plurality of turbines 15 and traversed through the plurality of flywheel turbines 17 which is individually connected to the each end. The plurality of chassis 16 will be depending on the plurality of the air intake vents 18 in the top housing 1. Since the plurality of air intake vents 18 is positioned above the plurality of chassis 16, the air flow from the plurality of air intake vents 18 will have direct contact with the plurality of chassis 16 making the present invention highly efficient. Therefore the number of the plurality of chassis 16 will be equal to the number of the plurality of air intake vents 18. The plurality of the air intake covers 11 will open away from the plurality of turbines 15 so the optimal air flow will connect with the plurality of the turbines 15. When the jet streamer turbine is in motion, the natural air will go through the plurality of air intake vents 18. The air flow will be directed into the plurality of turbines 15 by the plurality of air intake covers 11. The power is generated by the rotation of the plurality of turbines 15 and the plurality of generators 14. The excess air will be redirected toward the plurality of air exit vents 12 and the plurality of air release hooks 13 by the plurality of the flywheel turbines 17. The plurality of turbines 15, the plurality of chassis 16, and the plurality of flywheel turbines 17 can be made out of metals, high strength plastic or other suitable materials that is able to withstand the wear and tear of frequent movement. Non corrosive materials will be required since moisture from the natural air will be contacting the parts.

The center housing 2 comprises an air intake cover motor 21, a center housing circuit breaker 22, a center housing transformer 23, a center housing sensor 24, a center housing regulator 25 and a plurality of rechargeable batteries 26. The air intake cover motor 21 is positioned inside the center housing 2 and it is connected to the plurality of air intake covers 11 in the top housing 1. The air intake cover motor 21 is powered by the plurality of the rechargeable batteries 26. The plurality of the rechargeable batteries 26 is charged by the plurality of generators 14. The plurality of the rechargeable batteries 26 can be recharge from two methods. As for the first method, the system can be programmed through the center housing sensor 24, so the weakest battery out of the plurality of the rechargeable batteries 26 will be charged first. According to the first method, the battery life of the plurality of rechargeable batteries 26 will be longer because the plurality of rechargeable batteries 26 will not be charging all the time and only the low power level batteries will get charge. As for the second method, the plurality of generators 14 will have the plurality of rechargeable batteries 26 directly connected to each other so the plurality of the rechargeable batteries 26 will be constantly charging. According to the second method, all of the plurality of rechargeable batteries 26 will be fully charged whenever the users need to operates the present invention by battery power. The center housing circuit breaker 22, the center housing transformer 23, the center housing sensor 24, and the center housing regulator 25 will be positioned inside the center housing 2 and all of these components will be connected to each other so the jet streamer turbine will have a complete circuitry system.

The bottom housing 3 comprises a compressor 31, a main air hose 32, a plurality of heating elements 33, a bottom housing circuit breaker 34, a bottom housing transformer 35, a bottom housing sensor 36, and a bottom housing regulator 37. The compressor 31 is positioned inside the bottom housing 3 compartment. The main air hose 32 is connected with the compressor 31. The compressor 31 is powered by the plurality of rechargeable batteries 26 in low power conditions. If the compressor 31 needs to deliver a high power performance, an outside power source will be required. The outside power source can be an external solar power system which is connected to the jet streamer turbine or an electric outlet. The plurality of heating elements 33, the bottom housing circuit breaker 34, the bottom hosing transformer 35, the bottom housing sensor 36, and the bottom housing regulator 37 being positioned inside the bottom housing 3. The bottom housing circuit breaker 34, the bottom hosing transformer 35, the bottom housing sensor 36, and the bottom housing regulator 37 will provide a complete circuitry system for the plurality of rechargeable batteries 26. The plurality of heating elements 33 is put in place so the generated heat from the jet streamer turbine can be absorbed. The plurality of heating elements 33 will increase the efficiency of the jet streamer turbine by not letting the jet streamer turbine overheat. The plurality of heating elements 33 are made out of materials with higher specific heat capacity like ceramic.

The pair of vacuum fan housings comprises a first vacuum fan housing 4 and a second vacuum fan housing 5. The first vacuum fan housing 4 comprises a plurality of first flywheel turbine suction fans 41, a plurality of first flywheel turbine rim cross bars 411, a plurality of first suction fan motors 42, a plurality of first air release valves 43, a plurality of first air hoses 44, a plurality of first flywheel turbines 45 and a plurality of first rim generators 46. The plurality of first flywheel turbine suction fans 41 and the plurality of first flywheel turbines 45 are positioned within the first vacuum fan housing 4. The plurality of first flywheel turbine suction fans 41 is individually connected with the plurality of first suction fan motors 42. The plurality of first flywheel turbine rim cross bars 411 will be connecting the plurality of first flywheel turbine suction fans 41 and the plurality of first flywheel turbines 45 together. The plurality of first rim generators 46 is connected with the plurality of first flywheel turbines 45. The blades of the plurality of first flywheel turbine suction fans 41 will be closely packed like jet blades. The closely packed jet blades in the plurality of first flywheel turbine suction fans 41 will start rotating with minimum amount of air. The plurality of first air release valves 43 is connected with the plurality of first air hoses 44. The plurality first air hoses are connected to the first vacuum fan housing 4. The plurality of first air hoses 44 is connected to the main air hose 32 form the other end.

The second vacuum fan housing 5 comprises a second flywheel turbine suction fan 51, a second flywheel turbine rim cross bar 511, a second suction fan motor 52, a second air release valve 53, a second air hose 54, a second flywheel turbine 55 and a second rim generator 56. The second flywheel turbine suction fan 51 and the second flywheel turbine 55 are positioned within the second vacuum fan housing 5. The second flywheel turbine suction fan 51 is connected with the second suction fan motor 52. The second flywheel turbine rim cross bar 511 will be connecting the second flywheel turbine suction fan 51 and the second flywheel turbine 55 together. The second rim generator 56 is connected with the second flywheel turbine 55. The blades of the second flywheel turbine suction fan 51 will be closely packed like jet blades. The closely packed jet blades in the second flywheel turbine suction fan 51 will start rotating with minimum amount of air. The second air release 53 valve is connected with the second air hose 54. The second air hose 54 is connected to the second vacuum fan housing 5. The second air hose 54 is connected to the main air hose 32 form the other end.

The first vacuum fan housing 4 and the second vacuum fan housing 5 have three different ways of creating power. The system will be programmed so the system will choose the correct method under the available resources. The users of the jet streamer turbines also have the capability of choosing the correct method upon their preference. As for the first method in the first vacuum fan housing 4, after the compressor 31 provides the air flow through the main air hose 32, the air will go through the plurality of first air hoses 44 and the air flow will travel to the plurality of first air release valves 43. Then the air will be converted into an impulsion air blast because of the first air release valves 43. The impulsion air blast will turn the plurality of first flywheel turbines 45. Since the plurality of first flywheel turbines 45 are connected with the plurality of generators 14, the plurality of generators 14 will create power. As for the first method in the second vacuum fan housing 5, after the compressor 31 provides the air through the main air hose 32, the air flow will pass through the second air hose 54 and the air flow will travel to the second air release valve 53. Then the air flow will be converted into an impulsion air blast because of the second air release valve 53. The impulsion air blast will turn the second flywheel turbine 55. Since the second flywheel turbine 55 is connected with the plurality of generators 14, the plurality of generators 14 will create power. As for the second method, when the jet streamer turbine is in motion, the excess air flows out from the plurality of air exit vents 12 and the plurality of air release hooks 13. This excess air flow will rotate the plurality of first flywheel turbines 45 and the second flywheel turbine 55 creating power. As for the third method, when the jet streamer turbine is in stationary position, the plurality of first suction fan motors 42 and the second suction fan motor 52 will turn on and the plurality of first flywheel turbines 45 and the second flywheel turbine 55 will rotate respectively creating power. Since the input power to the plurality of first suction fan motors 42 and the second suction fan motor 52 much less than the output power from the jet streamer turbine, the net power of the system will be able to maintain the jet streamer turbine as a self sustaining unit.

The first vacuum fan housing 4 and the second vacuum fan housing 5 are attached to top housing 1. The plurality of air release hooks 13 will hold the first vacuum fan housing 4 and the second vacuum fan housing 5. The first vacuum fan housing 4 and the second vacuum fan housing 5 can be connected individually or together. Although both have the functionality of releasing the excess air, the air release hooks 13 and the air exit vents 12 are quite different members. The air release hooks are hook-like structures that hold the first vacuum fan housing 4 and the second vacuum fan housing 5 together. Whereas the air exit vents 12 do not have such a function. In addition, the air exit vents 12 release excessive air to the surrounding; while the air release hooks 13 release air to the first vacuum fan housing 4 and the second vacuum fan housing 5. In order to power the jet streamer turbine up to its maximum potential power both the first vacuum fan housing 4 and the second vacuum fan housing 5 will be needed. Since the first vacuum fan housing 4 and the second vacuum fan housing 5 are connected as separate components to the top housing 1, interchanging of the both vacuum fan units will be an easy task for the consumers. The first vacuum fan housing 4 and the second vacuum fan housing 5 can be made out of metals, high strength plastic or other suitable materials that is able to withstand the wear and tear of frequent movement.

The exit air housing 7 is positioned with the top housing 1 as the last component. The exit air housing 7 is designed to fit both first vacuum fan housing 4 and the second vacuum fan housing 5. The exit air housing 7 can be easily attached to the first vacuum fan housing 4 or the second vacuum fan housing 5. Because of the exit air housing 7 all of the exiting air from the present invention flows in a uniform manner. A plurality of backward extenders 71 will be the connecting component between the Exit air housing 7 and the first vacuum fan housing 4 or the second vacuum fan housing 5. The plurality of backward extenders 71 will be attached to the exit air housing 7. The plurality of backward extenders 71 can also tolerate the amount of air entering the system. The plurality of backward extenders 71 will extend backward to maximize the air flow though the jet streamer turbine when needed. If the jet streamer turbine is operating under high temperature, it can be dangerous to the jet streamer turbine. Then the plurality of backward extenders 71 will extend backward maximizing the air flow though the unit. The cool air from the surrounding will enter the system through the gaps created by the plurality of backward extenders 71 and cool down the system. Moreover the air flow through the present invention will increase due to the opening and helps to cool down the system also. The Exit air housing 7 is made out of light weighted materials that are capable of withstanding a great wind pressure and high temperature. These materials can be high strength heat resistance plastic, metal or combination of both.

The Nose propeller housing 6 comprises a flywheel turbine rim propeller 61 and a plurality of forward inward extenders 62. The flywheel turbine rim propeller 61 is attached to the Nose propeller housing 6. The flywheel turbine rim propeller 61 will rotate when the jet streamer turbine is in motion. Then the flywheel turbine rim propeller 61 will gather air from its surrounding and direct toward the plurality of air intake vents 18. Due to the flywheel turbine rim propeller 61, the jet streamer turbine will have an air flow. The plurality of forward inward extenders 62 is connected between the top housing 1 and the nose propeller housing 6. The plurality of forward inward extenders 62 will extend forward to minimize the air flow when needed. If the incoming air flow increases due to many different reasons, the increased air flow might be hazards to the safety of the jet streamer turbine. In order to protect the system, the plurality of forward inward extenders 62 will extend forward creating a gap between the nose propeller housing and the plurality of air intake vents 18 which will minimize the air flow because the air flow now will exit from the created gas, so as to lower the air pressure. The plurality of forward inward extenders 62 also has the capability of turning the nose propeller housing 6 up and down. The nose propeller housing 6 will not be fixed component on the jet streamer turbine. The size of the nose propeller housing 6 will depend on the different sizes and the number of jet streamer turbine. If there is more than one jet streamer turbines are present, the nose propeller housing 6 will be increased in its size to cover the multiple jet streamer turbines. The nose propeller housing 6 will be small in sizes for compact jet streamer turbines. The nose propeller housing 6 can be made out of light weight materials like high strength plastic, metal or combination of both. The flywheel turbine rim propeller 61 and the plurality of forward inward extenders 62 can be made out of strong materials like high strength plastic, metal or combination of both since both of these parts will be moving constantly.

There will be multiple sizes of the jet streamer turbines available to consumers and the different sizes will depend on the consumer's requirements and how the jet streamer turbines are being used. The jet streamer turbines can be put on a buildings or houses as an extra energy system. The use of the jet streamer turbines can be also range from commercial trucks to air planes. The jet streamer turbine can be easily attached to any kind of vehicles as an external device or it can be build into the vehicles. Either way, the jet streamer turbines will provide an extra energy source which can be used for any application within the vehicle. Since the plurality of forward inward extenders 62 can turn the nose propeller up and down, this technology will be valuable for airplanes. Extending the plurality of forward inward extenders 62 with an angle will turn the nose propeller up or down. This action will create a helicopter effect resulting a smoother landing of the air plane. The jet streamer turbines can be positioned along the wings of the air plane and it will generate power during its flight. The jet streamer turbines are will have a great effect on the reducing the environment pollution. The jet streamer turbines will able to produced energy and it will be self contained and both the consumers and the environment will benefit from its results.

Although the invention has been explained in relation to its preferred embodiment, it is to be understood that many other possible modifications and variations can be made without departing from the spirit and scope of the invention as hereinafter claimed.

What is claimed is:
1. A jet streamer turbine comprises,
a top housing;
a center housing;
a bottom housing;
a plurality of vacuum fan housing;
a nose propeller housing;
an exit air housing;
the plurality of vacuum fan housing comprise a first vacuum fan housing and a second vacuum fan housing;
the exit air housing comprises a plurality of backward extenders;
the top housing being connected to the center housing;
the bottom housing being connected to the center housing;
the first vacuum fan housing and the second vacuum fan housing being positioned behind the top housing;
the plurality of backward extenders being connected to the exit air housing;
the exit air housing being positioned behind the first vacuum fan housing or the second vacuum fan housing;
the nose propeller housing being connected to the top housing;
the top housing comprises a plurality of air intake covers, a plurality of air exit vents, a plurality of air release hooks, a plurality of generators, a plurality of turbines, a plurality of flywheel turbine, and a plurality of chassis;
the plurality of air intake covers being connected on the top housing;
the plurality of air exit vents being positioned on the top housing;
the plurality of air release hooks being connected on the top housing;
the plurality of generators being connected with the plurality of chassis;
the plurality of turbines being connected to the plurality of chassis;
the plurality of flywheel turbines being centrally inserted through the plurality of chassis; and
the plurality of chassis being positioned between the top housing and the center housing.
2. The jet streamer turbine as claimed in claim 1 comprises,
the center housing comprises an air intake cover motor, a center housing circuit breaker, a center housing transformer, a center housing sensor, a center housing regulator, and a plurality of rechargeable batteries;
the center housing circuit breaker, the center housing transformer, the center housing sensor, and the center housing regulator being positioned inside the center housing;
the air intake cover motor being connected with the plurality of air intake covers; and
the plurality of rechargeable batteries being jointly connected with the plurality of generators.
3. The jet streamer turbine as claimed in claim 1 comprises,
the bottom housing comprises a compressor, a main air hose, a plurality of heating elements, a bottom housing circuit breaker, a bottom hosing transformer, a bottom housing sensor, and a bottom housing regulator;
the main air hose being connected with the compressor; and the compressor, the plurality of heating elements, the bottom housing circuit breaker, the bottom hosing transformer, the bottom housing sensor, and the bottom housing regulator being positioned inside the bottom housing.
4. The jet streamer turbine as claimed in claim 1 comprises,
the first vacuum fan housing comprises a plurality of first flywheel turbine suction fans, a plurality of first flywheel turbine rim cross bars, a plurality of first suction fan motors, a plurality of first air release valves, a plurality of first air hoses, a plurality of first flywheel turbines, and a plurality of first rim generators;
the plurality of first flywheel turbine suction fans being connected with the plurality of the first suction fan motors;
the plurality of first flywheel turbines being connected to the plurality of first rim generators;
the plurality of first rim generators being connected with the plurality of rechargeable batteries;
the plurality of first flywheel turbines and the plurality of first flywheel turbine suction fans being connected by the plurality of first flywheel turbine rim cross bars;
the plurality of first air release valves being connected to the plurality of first air hoses; and
the plurality of first air release valves being positioned with the plurality of first flywheel turbines.
5. The jet streamer turbine as claimed in claim 1 comprises,
the second vacuum fan housing comprises a second flywheel turbine suction fan, a second flywheel turbine rim cross bar, a second suction fan motor, a second air release valve, a second air hose, a second flywheel turbine, and a second rim generator;
the second flywheel turbine suction fan being connected with the second suction fan motor;
the second flywheel turbine being connected to the second rim generator;
the second rim generator being connected with the plurality of rechargeable batteries;
the second flywheel turbine and the second flywheel turbine suction fan being connected by the second flywheel turbine rim cross bar;
the second air release valve being connected to the second air hose; and
the second air release valve being positioned with the second flywheel turbine.
6. The jet streamer turbine as claimed in claim 1 comprises,
the nose propeller housing comprises a flywheel turbine rim propeller and a plurality of forward inward extenders;
the flywheel turbine rim propeller being connected to the nose propeller housing;
the nose propeller housing being connected to the plurality of forward inward extenders; and
the plurality of forward inward extenders being connected to the top housing.
7. A jet streamer turbine comprises,
a top housing;
a center housing;
a bottom housing;
a plurality of vacuum fan housing;
a nose propeller housing;
an exit air housing;
the plurality of vacuum fan housing comprise a first vacuum fan housing and a second vacuum fan housing;
the exit air housing comprises a plurality of backward extenders;
the top housing being connected to the center housing;

the bottom housing being connected to the center housing;
the first vacuum fan housing and the second vacuum fan housing being positioned behind the top housing;
the plurality of backward extenders being connected to the exit air housing;
the exit air housing being positioned behind the first vacuum fan housing or the second vacuum fan housing;
the nose propeller housing being connected to the top housing;
the center housing comprises an air intake cover motor, a center housing circuit breaker, a center housing transformer, a center housing sensor, a center housing regulator, and a plurality of rechargeable batteries;
the center housing circuit breaker, the center housing transformer, the center housing sensor, and the center housing regulator being positioned inside the center housing;
the air intake cover motor being connected with the plurality of air intake covers; and
the plurality of rechargeable batteries being jointly connected with the plurality of generators.

8. The jet streamer turbine as claimed in claim 7 comprises,
the top housing comprises a plurality of air intake covers, a plurality of air exit vents, a plurality of air release hooks, a plurality of generators, a plurality of turbines, a plurality of flywheel turbine, and a plurality of chassis;
the plurality of air intake covers being connected on the top housing;
the plurality of air exit vents being positioned on the top housing;
the plurality of air release hooks being connected on the top housing;
the plurality of generators being connected with the plurality of chassis;
the plurality of turbines being connected to the plurality of chassis;
the plurality of flywheel turbines being centrally inserted through the plurality of chassis; and
the plurality of chassis being positioned between the top housing and the center housing.

9. The jet streamer turbine as claimed in claim 7 comprises,
the bottom housing comprises a compressor, a main air hose, a plurality of heating elements, a bottom housing circuit breaker, a bottom hosing transformer, a bottom housing sensor, and a bottom housing regulator;
the main air hose being connected with the compressor; and
the compressor, the plurality of heating elements, the bottom housing circuit breaker, the bottom hosing transformer, the bottom housing sensor, and the bottom housing regulator being positioned inside the bottom housing.

10. The jet streamer turbine as claimed in claim 7 comprises,
the first vacuum fan housing comprises a plurality of first flywheel turbine suction fans, a plurality of first flywheel turbine rim cross bars, a plurality of first suction fan motors, a plurality of first air release valves, a plurality of first air hoses, a plurality of first flywheel turbines, and a plurality of first rim generators;
the plurality of first flywheel turbine suction fans being connected with the plurality of the first suction fan motors;
the plurality of first flywheel turbines being connected to the plurality of first rim generators;
the plurality of first rim generators being connected with the plurality of rechargeable batteries;
the plurality of first flywheel turbines and the plurality of first flywheel turbine suction fans being connected by the plurality of first flywheel turbine rim cross bars;
the plurality of first air release valves being connected to the plurality of first air hoses; and
the plurality of first air release valves being positioned with the plurality of first flywheel turbines.

11. The jet streamer turbine as claimed in claim 7 comprises,
the second vacuum fan housing comprises a second flywheel turbine suction fan, a second flywheel turbine rim cross bar, a second suction fan motor, a second air release valve, a second air hose, a second flywheel turbine, and a second rim generator;
the second flywheel turbine suction fan being connected with the second suction fan motor;
the second flywheel turbine being connected to the second rim generator;
the second rim generator being connected with the plurality of rechargeable batteries;
the second flywheel turbine and the second flywheel turbine suction fan being connected by the second flywheel turbine rim cross bar;
the second air release valve being connected to the second air hose; and
the second air release valve being positioned with the second flywheel turbine.

12. The jet streamer turbine as claimed in claim 7 comprises,
the nose propeller housing comprises a flywheel turbine rim propeller and a plurality of forward inward extenders;
the flywheel turbine rim propeller being connected to the nose propeller housing;
the nose propeller housing being connected to the plurality of forward inward extenders; and
the plurality of forward inward extenders being connected to the top housing.

13. A jet streamer turbine comprises,
a top housing;
a center housing;
a bottom housing;
a plurality of vacuum fan housing;
a nose propeller housing;
an exit air housing;
the plurality of vacuum fan housing comprise a first vacuum fan housing and a second vacuum fan housing;
the exit air housing comprises a plurality of backward extenders;
the top housing being connected to the center housing;
the bottom housing being connected to the center housing;
the first vacuum fan housing and the second vacuum fan housing being positioned behind the top housing;
the plurality of backward extenders being connected to the exit air housing;
the exit air housing being positioned behind the first vacuum fan housing or the second vacuum fan housing;
the nose propeller housing being connected to the top housing;
the nose propeller housing comprises a flywheel turbine rim propeller and a plurality of forward inward extenders;
the flywheel turbine rim propeller being connected to the nose propeller housing;
the nose propeller housing being connected to the plurality of forward inward extenders;

the plurality of forward inward extenders being connected to the top housing;

the top housing comprises a plurality of air intake covers, a plurality of air exit vents, a plurality of air release hooks, a plurality of generators, a plurality of turbines, a plurality of flywheel turbine, and a plurality of chassis;

the plurality of air intake covers being connected on the top housing;

the plurality of air exit vents being positioned on the top housing;

the plurality of air release hooks being connected on the top housing;

the plurality of generators being connected with the plurality of chassis;

the plurality of turbines being connected to the plurality of chassis;

the plurality of flywheel turbines being centrally inserted through the plurality of chassis; and the plurality of chassis being positioned between the top housing and the center housing.

14. The jet streamer turbine as claimed in claim 13 comprises, the center housing comprises an air intake cover motor, a center housing circuit breaker, a center housing transformer, a center housing sensor, a center housing regulator, and a plurality of rechargeable batteries;

the center housing circuit breaker, the center housing transformer, the center housing sensor, and the center housing regulator being positioned inside the center housing;

the air intake cover motor being connected with the plurality of air intake covers; and the plurality of rechargeable batteries being jointly connected with the plurality of generators.

15. The jet streamer turbine as claimed in claim 13 comprises, the bottom housing comprises a compressor, a main air hose, a plurality of heating elements, a bottom housing circuit breaker, a bottom hosing transformer, a bottom housing sensor, and a bottom housing regulator;

the main air hose being connected with the compressor; and the compressor, the plurality of heating elements, the bottom housing circuit breaker, the bottom hosing transformer, the bottom housing sensor, and the bottom housing regulator being positioned inside the bottom housing.

16. The jet streamer turbine as claimed in claim 13 comprises, the first vacuum fan housing comprises a plurality of first flywheel turbine suction fans, a plurality of first flywheel turbine rim cross bars, a plurality of first suction fan motors, a plurality of first air release valves, a plurality of first air hoses, a plurality of first flywheel turbines, and a plurality of first rim generators;

the plurality of first flywheel turbine suction fans being connected with the plurality of the first suction fan motors;

the plurality of first flywheel turbines being connected to the plurality of first rim generators;

the plurality of first rim generators being connected with the plurality of rechargeable batteries;

the plurality of first flywheel turbines and the plurality of first flywheel turbine suction fans being connected by the plurality of first flywheel turbine rim cross bars;

the plurality of first air release valves being connected to the plurality of first air hoses;

the plurality of first air release valves being positioned with the plurality of first flywheel turbines;

the second vacuum fan housing comprises a second flywheel turbine suction fan, a second flywheel turbine rim cross bar, a second suction fan motor, a second air release valve, a second air hose, a second flywheel turbine, and a second rim generator;

the second flywheel turbine suction fan being connected with the second suction fan motor;

the second flywheel turbine being connected to the second rim generator;

the second rim generator being connected with the plurality of rechargeable batteries;

the second flywheel turbine and the second flywheel turbine suction fan being connected by the second flywheel turbine rim cross bar;

the second air release valve being connected to the second air hose; and the second air release valve being positioned with the second flywheel turbine.

* * * * *